(12) United States Patent
Lin et al.

(10) Patent No.: US 9,896,595 B2
(45) Date of Patent: Feb. 20, 2018

(54) ACRYLIC POLYMERS, 1K COATING COMPOSITIONS INCLUDING THE SAME, AND MULTILAYER COATING SYSTEMS INCLUDING A TOPCOAT LAYER FORMED FROM THE 1K COATING COMPOSITIONS

(71) Applicant: AXALTA COATING SYSTEMS IP CO., LLC, Wilmington, DE (US)

(72) Inventors: Jun Lin, Troy, MI (US); Jeffery Johnson, Rochester, MI (US)

(73) Assignee: AXALTA COATING SYSTEMS IP CO., LLC, Wilmington, DE (US)

( * ) Notice: Subject to any disclaimer, the term of this patent is extended or adjusted under 35 U.S.C. 154(b) by 353 days.

(21) Appl. No.: 14/673,119

(22) Filed: Mar. 30, 2015

(65) Prior Publication Data

US 2016/0289485 A1   Oct. 6, 2016

(51) Int. Cl.
- C09D 133/08 (2006.01)
- C09D 143/04 (2006.01)
- C09D 125/14 (2006.01)
- C09D 133/06 (2006.01)
- C08F 230/08 (2006.01)
- C08F 212/08 (2006.01)
- C08F 220/18 (2006.01)

(52) U.S. Cl.
CPC .......... C09D 133/08 (2013.01); C08F 212/08 (2013.01); C08F 220/18 (2013.01); C08F 230/08 (2013.01); C09D 125/14 (2013.01); C09D 133/066 (2013.01); C09D 143/04 (2013.01)

(58) Field of Classification Search
None
See application file for complete search history.

(56) References Cited

U.S. PATENT DOCUMENTS 5,369,153 A * 11/1994 Barsotti ............. C09D 133/064
523/429
5,814,410 A   9/1998 Singer et al.

OTHER PUBLICATIONS

Momentive. Technology Backgrounder. [online]. 2012. [retrieved on Mar. 26, 2015]. Retrieved from Internet: <URL: https://momentive.com/assets/0/97/124/3BC9A3B6-B992-4C5A-B65F-D50862378A45.pdf>.

* cited by examiner

Primary Examiner — Sheeba Ahmed
(74) Attorney, Agent, or Firm — Lorenz & Kopf LLP

(57) ABSTRACT

Acrylic polymers, 1K coating compositions including the same, and multilayer coating systems including a topcoat layer formed from the 1K coating compositions are provided herein. In an embodiment, a 1K coating composition includes an acrylic polymer having a nominal Tg of at least 25° C. and a melamine crosslinker. The acrylic polymer includes a free radical-polymerized backbone and pendant chains bonded thereto. A first pendant chain of the acrylic polymer includes a first segment and a second segment. The first segment includes an ester linkage and a secondary hydroxyl group. The second segment is connected to the first segment and includes an ester linkage and a branched hydrocarbon chain. A second pendant chain of the acrylic polymer includes a primary hydroxyl group or a urethane-containing group formed therefrom.

9 Claims, No Drawings

ACRYLIC POLYMERS, 1K COATING COMPOSITIONS INCLUDING THE SAME, AND MULTILAYER COATING SYSTEMS INCLUDING A TOPCOAT LAYER FORMED FROM THE 1K COATING COMPOSITIONS

TECHNICAL FIELD

The technical field generally relates to acrylic polymers, 1K coating compositions including the same, and multilayer coating systems including a topcoat layer formed from the 1K coating compositions. More particularly, the technical field relates to acrylic polymers, 1K coating compositions that include the acrylic polymers, and topcoat layers formed from the 1K coating compositions that exhibit excellent environmental resistance and compatibility with an underlying basecoat layer.

BACKGROUND

Coating compositions are utilized to form coatings such as, for example, primer layers, basecoat layers and clearcoat layers, for protective and decorative purposes. These coatings can be used in automotive OEM and refinish coating applications and provide a protective layer for the underlying substrate and can also have an aesthetically pleasing value. Presently, automotive coatings are multilayer coating systems including a topcoat layer overlying a basecoat layer, with the basecoat layer overlying one or more additional layers such as a primer layer and an electrocoat layer. The topcoat layer may be a clearcoat layer or a pigment-containing topcoat layer. Various considerations impact the appearance and durability of the multilayer coating systems, including chemistry of the topcoat layer as well as compatibility of the topcoat layer and the basecoat layer. Acid rain and other air pollutants often cause problems of water spotting and acid etching of the topcoat layer, with such problems associated with the chemistry of the topcoat layer. Mismatched cure rates between coating compositions of the basecoat layer and the topcoat layers may limit an application window during which period the topcoat layers may be applied to achieve acceptable intercoat bonding.

Different environmental resistance and intercoat bonding considerations exist depending upon the type of cure mechanism. For one-pack (1K) coating compositions, common cure mechanisms employ melamine crosslinkers during curing. In particular, the 1K coating compositions include one or more acrylic resins having branches that contain melamine-reactive functionality, and crosslinking only occurs during baking such that the acrylic resins and melamine can be packaged together. Melamine-reactive functionality includes primary and secondary hydroxyl groups, urethane functionality, carbamate functionality, and alkoxysilyl groups. It is generally known that acrylosilane/melamine and carbamate/melamine crosslinking chemistries provide excellent environmental resistance as compare to primary hydroxyl/melamine crosslinking chemistries. By "acrylosilane/melamine", "carbamate/melamine", or "primary hydroxyl/melamine" crosslinking chemistries, it is meant that those reactions are the predominant crosslinking reactions that occur during curing although it is to be appreciated that other crosslinking reactions may also occur but to a lesser extent than the predominant crosslinking reaction.

Acrylosilane/melamine and carbamate/melamine crosslinking chemistries are costly. Further, typical basecoat compositions often employ melamine/primary hydroxyl crosslinking chemistries. Cure rates for the acrylosilane/melamine and carbamate/melamine crosslinking chemistries are significantly slower than cure rates for the melamine/primary hydroxyl crosslinking chemistries. Carbamate/melamine crosslinking chemistries are sensitive to the presence of primary hydroxyl groups such that increasing primary hydroxyl content to match cure rate with the basecoat compositions is not feasible. Further, primary hydroxyl/melamine crosslinking chemistries exhibit poor environmental resistance, thereby driving many efforts away from primary hydroxyl/melamine crosslinking chemistries in 1K coating compositions for automotive applications.

Accordingly, it is desirable to provide 1K coating compositions and acrylic polymers for use therein that form topcoat layers having comparable environmental resistance to those formed using acrylosilane/melamine and/or carbamate/melamine crosslinking chemistries while also achieving a closer cure rate match to chemistries used for the basecoat layer. Furthermore, other desirable features and characteristics will become apparent from the subsequent detailed description and the appended claims, taken in conjunction with the accompanying drawings and this background.

BRIEF SUMMARY

Acrylic polymers, 1K coating compositions including the same, and multilayer coating systems including a topcoat layer formed from the 1K coating compositions are provided herein. In an embodiment, an acrylic polymer is provided that has a nominal Tg of at least 25° C. The acrylic polymer includes the reaction product of a first acrylic monomer, a second monomer, and a glycidyl ester. The first monomer has an acid group. The second acrylic monomer has a primary hydroxyl group. The glycidyl ester has an epoxy group and a branched hydrocarbon chain.

In another embodiment, a 1K coating composition includes an acrylic polymer having a nominal Tg of at least 25° C. and a melamine crosslinker. The acrylic polymer includes a free radical-polymerized backbone and pendant chains bonded thereto. A first pendant chain of the acrylic polymer includes a first segment and a second segment. The first segment includes an ester linkage and a secondary hydroxyl group. The second segment is connected to the first segment and includes an ester linkage and a branched hydrocarbon chain. A second pendant chain of the acrylic polymer includes a primary hydroxyl group or a urethane-containing group formed therefrom.

In another embodiment, a multilayer coating system includes an optionally pre-coated base substrate, a basecoat layer overlying the optionally pre-coated base substrate, and a topcoat layer overlying the basecoat layer. The topcoat layer includes the reaction product of an acrylic polymer and a melamine crosslinker. The acrylic polymer includes a free radical-polymerized backbone and pendant chains bonded thereto. A first pendant chain of the acrylic polymer includes a first segment and a second segment. The first segment includes an ester linkage and a secondary hydroxyl group. The second segment is connected to the first segment and includes an ester linkage and a branched hydrocarbon chain. A second pendant chain of the acrylic polymer includes a primary hydroxyl group or a urethane-containing group formed therefrom.

DETAILED DESCRIPTION

The following detailed description is merely exemplary in nature and is not intended to limit the acrylic polymers, 1K coating compositions, and multilayer coating systems as described herein. Furthermore, there is no intention to be bound by any theory presented in the preceding background or the following detailed description.

Acrylic polymers and 1K coating compositions are provided herein, and the acrylic polymers and 1K coating compositions may be employed to form a topcoat layer of a multilayer coating system such as those employed in automotive OEM and refinish coating applications. 1K coating compositions, as described herein, are one-pack coating compositions that contain both a crosslinker and a resin component (which includes the acrylic polymer among other compounds formed from at least two monomeric units and that are reactive with the crosslinker during curing). For purposes herein, the crosslinker is a melamine crosslinker. The acrylic polymers have a nominal glass transition temperature (Tg) of at least 25° C. The nominal Tg, as described herein, is calculated by the Fox equation based upon monomers subject to polymerization to form the acrylic polymer, including the monomers that are subject to free radical polymerization to form the free radical-polymerized backbone as well as additional non-isocyanate functional monomers that are further reacted with pendant groups of the free radical-polymerized backbone. Acrylic polymers, as described herein, are polymers having a free radical-polymerized backbone formed from reaction of unsaturated functionality of acrylic monomers. The acrylic monomers have additional functional groups that remain in the acrylic polymer or that are reacted with additional monomers, either before, during, or after free radical polymerization, to form the acrylic polymer that is ultimately included in the 1K coating compositions. In this regard, the acrylic polymer is the free radical reaction product of various acrylic monomers containing functional groups and is further the reaction product of additional monomers and the functional groups (either before, during, or after free radical polymerization) that thereby form pendant chains in the acrylic polymer. A first pendant chain of the acrylic polymer includes two segments: a first segment that includes an ester linkage and a secondary hydroxyl group and a second segment that is connected to the first segment and that includes an ester linkage and a branched hydrocarbon chain. A second pendant chain of the acrylic polymer includes a primary hydroxyl group. It is to be appreciated that numerous additional pendant chains may be present in the acrylic polymer, as described below, and that the primary hydroxyl group may be further reacted with a partially-blocked isocyanate to impart the acrylic polymer with a urethane-containing group (although the partially-blocked isocyanate does not factor in to the calculated nominal Tg of the acrylic polymer). Without being bound by theory, it is believed that the relatively high nominal Tg of the acrylic polymer inhibits migration of environmental etchants (such as those found in acid rain) from entering the bulk interior of the topcoat layer in the multilayer coating systems. The relatively high nominal Tg, in combination with the structure of the first pendant chain as described above, provides topcoat layers formed from the 1K coating compositions with excellent environmental resistance even when the primary hydroxyl groups are present in high amounts within the acrylic polymers. In particular, it is believed that the relatively high nominal Tg and steric hindrance of the secondary hydroxyl group in the first pendant chain balance the detrimental impact on environmental resistance attributable to higher primary hydroxyl content (and, thus, higher content of primary hydroxyl/melamine crosslinks) that is desired to more closely match the cure rate of the 1K coating composition with a basecoat composition employed to form a basecoat layer of the multilayer coating system. As a result, 1K coating composition as described herein may be formulated to provide topcoat layers having comparable environmental resistance to those formed using acrylosilane/melamine and/or carbamate/melamine crosslinking chemistries while also achieving a closer cure rate match to chemistries used for the basecoat layer. Additionally, at least some of the primary hydroxyl groups in the acrylic polymer can be reacted with partially-blocked polyisocyanate to form urethane containing groups that are reactive with melamine to form urethane/melamine crosslinks, which provide enhanced environmental resistance as compare primary hydroxyl/melamine crosslinks.

As alluded to above, the acrylic polymer includes a free radical-polymerized backbone and pendant chains bonded thereto. The acrylic polymer includes at least two different types of pendant chains. A first pendant chain includes a first segment and a second segment. The first segment, which is proximal to the free radical-polymerized backbone, includes an ester linkage and a secondary hydroxyl group. The secondary hydroxyl group is bonded on an opposite side of the ester linkage from the free radical-polymerized backbone. The second segment is connected to the first segment and includes an ester linkage and a branched hydrocarbon chain. In this regard, the first pendant chain includes two ester linkages with the secondary hydroxyl group bonded between the two ester linkages, and the first pendant chain is capped with the branched hydrocarbon chain. In embodiments, the branched hydrocarbon chain of the first pendant group is branched from an alpha carbon with respect to the ester functionality of the second segment, and the branched hydrocarbon chain has 8 or 9 carbon atoms. However, it is to be appreciated that the number of carbon atoms in the branched hydrocarbon chain is not particularly limited. Given the location and steric hindrance of the secondary hydroxyl group in the first pendant chain, it is believed that secondary hydroxyl/melamine crosslinks are formed that exhibit enhanced environmental resistance over secondary hydroxyl/melamine crosslinks formed from less hindered secondary hydroxyl groups.

The first pendant chains as described above may be formed by reacting an acid-functional monomer and an additional monomer such as an epoxy functional ester, e.g., a glycidyl ester having an epoxy group and a branched hydrocarbon chain. In particular, an acid functional monomer may be employed to form the acrylic polymer, and the epoxy functional ester reacts with the acid group of the first acrylic monomer to form the ester linkage of the first segment and the secondary hydroxyl group. The ester and the branched hydrocarbon chain of the epoxy functional ester remain after reaction and constitute the second segment as described above. Examples of suitable acid functional monomers that may be employed include acrylic acid and/or methacrylic acid. Examples of suitable epoxy functional esters that may be employed include those available under the tradename Cardura™ from Momentive Specialty Chemicals Inc. of Columbus, Ohio.

In addition to the first pendant chain and as alluded to above, the acrylic polymer further includes a second pendant chain. The second pendant chain includes a primary hydroxyl group and is provided for purposes of matching a cure rate of the 1K coating composition with that of a basecoat composition that is employed to form an underlying basecoat layer of the multilayer coating system. By "matching", it is meant that the cure rate of the 1K coating composition is manipulated, through control of primary hydroxyl content in the acrylic polymer, to be sufficiently similar to the cure rate of the base coat composition given a target formulation window during formation of the multilayer coating system. To be clear, "matching" of the cure rates does not require that the 1K coating composition and the basecoat composition exhibit identical cure rates. Primary hydroxyl content of the acrylic polymer can vary greatly depending upon the basecoat composition and can be controlled based upon relative ratios of primary hydroxyl-containing monomers that are employed to form the acrylic polymer. Various primary hydroxyl-containing monomers may be employed to form the acrylic polymer including, but not limited to, hydroxyethyl acrylate (HEA), hydroxyethyl methacrylate (HEMA), or a combination thereof.

In addition to the first pendant chain and the second pendant chain, the acrylic polymer may include one or more additional pendant chains. The one or more additional pendant chains may be present in the acrylic polymer to control nominal Tg of the acrylic polymer and/or to provide additional melamine-reactive functionality. For example, in an embodiment, the acrylic polymer further includes a third pendant chain that includes an aromatic group. Pendant chains that contain aromatic groups generally have an outsized effect on increasing nominal Tg of the acrylic polymer. The third pendant chain that includes the aromatic group may be incorporated into the acrylic polymer by employing an unsaturated monomer that contains an aromatic group to form the acrylic polymer. Examples of suitable unsaturated monomers that contain an aromatic group include, but are not limited to, styrene, vinylnaphthalene, vinylanthracene, combinations thereof, or other polyaromatic monomers having unsaturated functionality.

In an embodiment, the acrylic polymer further includes a fourth pendant chain that includes an ester linkage and a branched hydrocarbon chain. The fourth pendant chain may be provided in addition to the third pendant chain to control nominal Tg of the acrylic polymer. The branched hydrocarbon chain of the fourth pendant chain may have from 3 to 12 carbon atoms, such as from 4 to 8 carbon atoms. The fourth pendant chain that includes the ester linkage and a branched hydrocarbon chain may be incorporated into the acrylic polymer by employing an acrylic monomer having the branched hydrocarbon chain during formation of the acrylic polymer. Examples of suitable acrylic monomers having a branched hydrocarbon chain include, but are not limited to, isobutylacrylate (IBA), isobutylmethacrylate (IBMA), ethylhexylacrylate (EHA), ethylhexylmethacrylate (EHMA), and combinations thereof.

In an embodiment, the acrylic polymer further includes a fifth pendant chain that includes an ester linkage and a secondary hydroxyalkyl group, i.e., an alkyl group having a secondary hydroxyl group bonded thereto. The fifth pendant chain is different from the first pendant chain in that the fifth pendant chain is free from a second ester linkage. The fifth pendant chain may be provided in addition to the first pendant chain and the second pendant chain to provide additional secondary hydroxyl functionality in the acrylic polymer. While secondary hydroxyl/melamine crosslinks formed during curing exhibit enhanced environmental resistance as compared to primary hydroxyl/melamine crosslinks, the secondary hydroxyl/melamine crosslinks generally exhibit inferior environmental resistance as compared to urethane/melamine crosslinks and secondary hydroxyl/melamine crosslinks involving the hindered secondary hydroxyl group from the first pendant chain. The fifth pendant chain may thus be employed to control cure rate of the acrylic polymer while alleviating impact of primary hydroxyl on environmental resistance of the resulting topcoat layer. The fifth pendant chain that includes the ester linkage and the secondary hydroxyalkyl group may be incorporated into the acrylic polymer by employing an acrylic monomer having the hydroxyalkyl group during formation of the acrylic polymer. Examples of suitable acrylic monomers having the ester linkage and the secondary hydroxyalkyl group include, but are not limited to, hydroxypropyl acrylate (HPA), hydroxypropyl methacrylate (HPMA), hydroxybutylacrylate (HBA), hydroxybutylmethacrylate (HBMA), and combinations thereof. In embodiments, the acrylic polymer is substantially free from any other pendant groups beyond those described above, i.e., the acrylic polymer is free from additional pendant groups beyond those described above as determined using conventional diagnostic equipment.

It is to be appreciated that the acrylic polymer may include yet further pendant chains beyond those described above. For example, in an embodiment, the one or more additional pendant chains includes an ester linkage and an unbranched hydrocarbon chain and may be incorporated into the acrylic polymer by employing an acrylic monomer such as methyl methacrylic during formation of the acrylic polymer. Methyl methacrylate has a similar effect on nominal Tg of the acrylic polymer as styrene and may be employed for nominal Tg adjustment of the acrylic polymer.

As alluded to above, the acrylic polymer has the nominal Tg of at least 25° C., such as from about 25° C. to about 60° C., such as from about 28° C. to about 50° C., such as from about 30° C. to about 50° C., such as from about 35° C. to about 45° C., or such as from about 40° C. to about 50° C. The nominal Tg of the acrylic polymer is dependent upon the Tg contributed from the individual monomers that are reacted through free radical polymerization to form the free radical-polymerized backbone of the acrylic polymer as well as additional monomers that are reacted with pendant groups of the resulting free radical-polymerized backbone in accordance with the Fox equation for determining acrylic polymer Tg. The Fox equation for determining acrylic polymer Tg is provided as follows:

$$\frac{100\%}{T_{g,polymer}} = \sum_{i=1}^{n} \left(\frac{wt\ \%}{T_g}\right)_{monomer\ i}$$

n=number of monomers in the acrylic polymer

Thus, amounts of the individual monomers employed to form the acrylic polymer may be adjusted to achieve the desired nominal Tg while also formulating the acrylic polymer with a desired content of primary and secondary hydroxyl groups in the pendant chains to achieve a desired cure rate of the 1K coating composition that matches that of the basecoat composition employed in a given multilayer coating system.

As alluded to above, the acrylic polymers may include a urethane-containing group. However, the relevant nominal Tg as described herein is based on that of the acrylic polymer prior to any further reaction with isocyanate-functional compounds (e.g. partially-blocked polyisocyanate) and/or melamine crosslinker. The urethane-containing group is formed by reacting the primary hydroxyl functionality with a partially-blocked polyisocyanate prior to cure of the 1K coating composition. Urethane/melamine crosslinks exhibit superior environmental resistance as compared to primary hydroxyl/melamine crosslinks and, thus, reaction of some of the primary hydroxyl groups with the partially-blocked polyisocyanate may enhance environmental resistance of the resulting topcoat layer formed from the 1K coating composition. Of course, the degree of primary hydroxyl/partially-blocked polyisocyanate reaction may be balanced with cure rate considerations for matching the cure rate of the 1K coating composition with the basecoat composition.

In embodiments, the 1K coating composition has a cure rate relative to the basecoat composition that enables a sufficiently long application window for the 1K coating composition for purposes of conventional techniques for forming multilayer coating systems. To determine cure rates of the 1K coating composition and the basecoat composition, the compositions are applied to a substrate and cured at an ambient temperature ramp rate of from 2 to 30° C./min. Cure rates may be characterized in terms of difference between ambient temperature at the start of composition application and ambient temperature at gelling. For example, a composition that gels within 5 minutes at a 10° C./min ambient temperature ramp rate has a cure rate of 50° C. In embodiments, the 1K coating composition has a cure rate that is different from that of the basecoat composition employed to form the basecoat layer of the multilayer coating system by less than or equal to about 10° C. from the start of composition application to an ambient temperature at which the compositions are gelled, such as from about 5° C. lower to about 5° C. higher, when the bake oven has a temperature ramp rate from 2 to 30° C./min. For example, for a topcoat composition having a cure rate of 50° C. at a 10° C./min ambient temperature ramp rate, the 1K coating composition has a cure rate of from 40 to 60° C. at the 10° C./min ambient temperature ramp rate. The cure rates could alternatively be determined based on the temperatures at which the compositions start to increase in viscosities or modulus, with cure rate differences between the 1K coating composition and the topcoat composition determined based thereupon. Differences in cure rate within the ranges set forth above still enable a sufficiently long application window for purposes of conventional techniques for forming multilayer coating systems by OEMs and refinishers.

The partially-blocked polyisocyanate employed to form the urethane-containing group in the acrylic polymer is, more particularly, a partially-blocked polyisocyanate that has at least one free isocyanate group for reacting with the primary hydroxyl present in the acrylic polymer. Examples of suitable isocyanates that may be employed in the blocked isocyanate include aliphatic aromatic polyisocyanates or a mixture of the two. Specific examples of suitable aromatic diisocyanates include, but are not limited to, 4,4'-diphenyl-methane diisocyanate and toluene diisocyanate. Examples of suitable aliphatic diisocyanates are straight chain aliphatic diisocyanates such as 1,6-hexamethylene diisocyanate. Also, cycloaliphatic diisocyanates can be employed. Examples of suitable cycloaliphatic diisocyanates include isophorone diisocyanate and 4,4'-methylene-bis-(cyclohexyl-isocyanate). Examples of suitable higher polyisocyanates that may be employed include 1,2,4-benzene triisocyanate and polymethylene polyphenyl isocyanate.

Suitable blocking agents for the partially-blocked polyisocyanate include those that result in permanent or removable blocking groups bonded with isocyanate functionality of the isocyanates. For example, mono-alcohols may be employed to form a permanent blocking group and 3,5-dimethylpryazole (DMP) may be employed to form a removable blocked group.

In embodiments, the acrylic polymer has the following general formula:

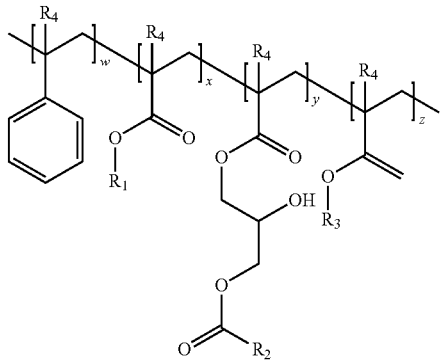

wherein $R_1$ is a primary hydroxyalkyl group or a urethane-containing group formed therefrom; $R_2$ is a branched alkyl group; $R_3$ is chosen from a secondary hydroxyalkyl group, a branched alkyl group, or a combination thereof; $R_4$ is individually chosen from hydrogen or a methyl group; w, x, and y are each at least 1; and z is 0 or at least 1. In specific embodiments, $R_1$ is hydroxyethyl; $R_2$ is a branched hydrocarbon chain having 7 or 8 carbon atoms, with branching at the alpha carbon of the $R_2$ group; $R_3$ is chosen from C3 to C9 secondary hydroxyalkyl groups, branched C3 to C10 alkyl groups, or combinations thereof. In another specific embodiment, z is at least 1 and $R_3$ includes the secondary hydroxyalkyl group. In another specific embodiment, z is at least 2 and $R_3$ individually includes the secondary hydroxyalkyl group and the branched alkyl group. In another specific embodiment, $R_1$ includes the urethane-containing group formed from the reaction of the primary hydroxyalkyl group and the partially-blocked polyisocyanate having at least one free isocyanate group, with the partially-blocked polyisocyanate including isocyanate groups blocked with the permanent blocking group or the removable blocking group. As alluded to above, urethane/melamine crosslinks provide enhanced environmental resistance as compare primary hydroxyl/melamine crosslinks. As such, permanent blocking groups for the partially-blocked polyisocyanate may provide enhanced environmental resistance as compared to removable blocking groups, which may deblock from the polyisocyanate during cure of the 1K coating composition with isocyanate/hydroxyl formed at the unblocked isocyanate sites. In this embodiment, the secondary hydroxyl group of the first pendant chain remains unreacted in the acrylic urethane due to the steric hindrance thereof, which enables controlled formation of the urethane-containing groups from the primary hydroxyl functionality while leaving the secondary hydroxyl of the first pendant chain unreacted.

In embodiments, the acrylic polymer as described extensively above is present as a species of a resin component of the 1K coating composition. The resin component, as referred to herein, encompasses all compounds present within the 1K coating composition that are formed from at least two monomeric units and that are reactive with melamine during curing. The resin component can include one or more additional acrylic polymers other than those having the features of the above-described acrylic polymers, and can further include silane polymers, urethane-containing polymers or oligomers, and the like. Examples of silane polymers include hydroxy functional acrylosilane polymers. Examples of urethane oligomers include those having a urethane-containing backbone and that are the reaction product of an isocyanate compound and at least one isocyanate-reactive compound.

When the resin component contains species other than the acrylic polymers having the nominal Tg of at least 25° C., as described above, the acrylic polymers having the Tg of at least 25° C. are the predominant species present in the resin component and constitute at least 25 weight %, such as from about 30 to about 50 weight %, or such as from about 40 to about 50 weight %, of the resin component based upon the total weight of the resin component in the 1K coating composition. Additional species of the resin component other than the acrylic polymers having the Tg of at least 25° C. constitute a combined amount of less than about 75 weight %, such as from about 50 to about 70 weight %, of the resin component based on the total weight of the resin component in the 1K coating composition. Further, none of the additional species are present in an amount greater than the acrylic polymers that have the nominal Tg of at least 25° C., as described above. Of the additional species, additional acrylic polymers other than those having the features of the above-described acrylic polymers may be present in the 1K coating composition in a total amount of less than about 25 weight %, such as from about 10 to about 20 weight %, based on the total weight of the resin component in the 1K coating composition. Silane polymers may be present in the 1K coating composition in a total amount of less than about 25 weight %, such as from about 10 to about 15 weight %, based on the total weight of the resin component in the 1K coating composition. Urethane oligomers may be present in the 1K coating composition in a total amount of less than about 35 weight %, such as from about 15 to about 30 weight %, based on the total weight of the resin component in the 1K coating composition. Additionally, the resin component may be present in the 1K coating composition in an amount of at least about 50 weight %, such as from about 60 to about 70 weight %, based upon total non-volatile content of the 1K coating composition.

As alluded to above, the 1K coating composition further includes the melamine crosslinker. In embodiments, the melamine crosslinker is an alkylated melamine formaldehyde resin that is partially or fully alkylated, for example a methylated and butylated or isobutylated melamine formaldehyde resin that has a degree of polymerization of from about 1 to about 5. The melamine crosslinker may be present in the 1K coating composition in an amount sufficient to crosslink with substantially all melamine-functional groups present in the resin component.

In addition to the resin component and the melamine crosslinker, additional additives may also be present in the 1K coating composition. The additives, as referred to herein, encompass all components other than the resin component, melamine crosslinker, and solvent present in the 1K coating composition. In embodiments, the 1K coating composition is employed to form a pigment-containing topcoat layer, in which case the 1K coating composition may include a pigment component. In other embodiments, the 1K coating composition is employed to form a pigment-free topcoat layer, i.e., a clearcoat layer. In addition to optional pigment, other optional additives include, but are not limited to, plasticizers, flow control agents, anti-settling agents, antioxidants, UV light absorbers, catalysts, and the like. The additives may be present in the 1K coating composition in an amount of up to about 15 weight %, such as from about 5 to about 10 weight %, based on the total non-volatile weight of the 1K coating composition. Additionally, an organic solvent may be present in the 1K coating composition. In embodiments, the organic solvent is an alcohol solvent such as, but not limited to, methanol, isopropanol, butanol, ethylene glycol, and the like. Other suitable solvents may also include, but are not limited to, ethyl 3-ethoxy propionate, aromatic 100, propylene glycol monoethyl ether acetate, toluene, xylene, butyl acetate, acetone, methyl isobutyl ketone, methyl ethyl ketone, hexane, heptane, monoethyl ether, monoethyl ether acetate, VM and P naptha, mineral spirits, and other aliphatic, cycloaliphatic, aromatic hydrocarbons, esters, ethers, acetates, propionates, ketones and the like. Combinations of any of the aforementioned solvents may be used. The solvent may be present in the 1K coating composition in a total amount of from about 0.1 to about 10 weight %, such as from about 0.1 to about 5 weight %, based upon the total weight of the 1K coating composition.

As alluded to above, the 1K coating composition as described herein may be employed to form a topcoat layer of a multilayer coating system. The multilayer coating system may be a coating system used in automotive OEM and refinish coating applications, although it is to be appreciated that the 1K coating composition as described herein may be useful for any application in which environmental resistance is a concern, as well as applications where cure rate matching with a basecoat composition for an underlying basecoat layer is a concern. The multilayer coating system may include an optionally pre-coated base substrate. The pre-coated base substrate may be a panel of an automobile and may include a metal or plastic substrate optionally including an electrocoat layer and a primary layer, as well as any other conventional layer generally employed in automotive coatings. A basecoat layer overlies the base substrate. More particularly, in embodiments, the basecoat layer overlies the primary layer. The topcoat layer overlies the basecoat layer, and the topcoat layer includes the cured product of the 1K coating composition as described above. In embodiments, the base coat layer includes the reaction products of polyester and acrylic polyol resins and melamine crosslinker. Conventional polyester resins may be employed to form the basecoat layer.

The multilayer coating system that includes the topcoat layer formed from the 1K coating composition as described herein exhibit excellent environmental resistance, as measured in accordance with Jacksonville environmental testing. Environmental resistance, or etch resistance, is tested by exposing test panels having the multilayer coating system at a test facility in Jacksonville, Fla. for about 3 months during the summer. A visual scale of 1 to 10 was used to determine etch resistance, with 10 being worst (melamine coatings are typically rated at 10) and 1 being the best. Topcoat layers formed from the 1K coating compositions as described herein exhibit environmental resistance comparable to topcoat layers formed from comparative 1K coating compositions in which silane polymers are the predominant species of the resin component. Further, the topcoat layers formed from the 1K coating compositions as described herein exhibit significantly enhanced environmental resistance as compared to comparative 1K coating compositions that employ other non-silane acrylic polymers as the predominant species of the resin component.

EXAMPLES

Various acrylic and silane polymers were prepared by copolymerizing monomers as shown in TABLE I in the presence of a 2/1 Solvesso 100 aromatic solvent/butanol mixture and 8 parts by weight of Vazo® 67. The resulting polymer solutions had about a 70 weight % solids content and a viscosity of F-R on the Gardner Holdt scale measured at 25° C. The polymers all have a weight average molecular weight of approximately 4,500 gram/mole.

TABLE I

|  | Acrylic Polymer 1 | Acrylic Polymer 2 | Acrylic Polymer 4 | Acrylic Polymer 5 | Silane Polymer 1 | Silane Polymer 2 |
|---|---|---|---|---|---|---|
| HEA | 32 | — | — | — | — | — |
| HEMA | — | 10 | — | — | — | — |
| HPA | — | — | 38 | 40 | 10 | 20 |
| HPMA | — | 17.9 | — | — | — | — |
| MAPTS | — | — | — | — | 65 | 30 |
| Styrene | 25 | 30 | 15 | — | 10 | 25 |
| BMA | 43 | — | 30 | 60 | — | — |
| IBMA | — | — | — | — | 12 | 23 |
| BA | — | — | 17 | — | 3 | 2 |
| EHMA | — | 22.3 | — | — | — | — |
| CE10 | — | 15 | — | — | — | — |
| MAA | — | 0.2 | — | — | — | — |
| MA | — | 4.6 | — | — | — | — |
| $T_g$ | 23° C. | 40° C. | 2° C. | 8.5° C. | 2° C. | 24° C. |

In TABLE I, HEA is hydroxyethylacrylate; HEMA is hydroxyethylmethacrylate; HPA is hydroxypropylacrylate; HPMA is hydroxypropylmethacrylate; MAPTS is 3-methacryloxypropyltrimethoxysilane; BMA is butylmethacrylate; IBMA is isobutylmethacrylate; BA is butylacrylate; EHMA is ethylhexylmethacrylate; CE10 is a glycidyl ester having a C8 branched alkyl group; MAA is methacrylic acid; and AA is acrylic acid.

A urethane oligomer was prepared by combining 196 parts by weight of an aliphatic polyisocyanate resin based on hexamethylene diisocyanate (HDI) having an NCO content of 21.8 weight % and 80 parts by weight of ethyl 3-ethoxypropionate in a reactor and heating the resulting mixture to 60° C. under nitrogen blanket. To this mixture, 140 parts by weight of 2-ethylhexanol was added over 60 minutes and the mixture was continually mixed at the temperature of 60° C. for 6 hours. The resulting urethane oligomer composition had about 80 weight % solids.

Partially-blocked polyisocyanate was prepared by charging 177.8 parts by weight of isophorone diisocyanate (IPDI) and 80 parts by weight of ethyl 3-ethoxypropionate to a reactor and heating the resulting mixture to 60° C. under nitrogen blanket. To this mixture, 106.7 parts by weight of 2-ethylhexanol was added over 60 minutes and the mixture was continually mixed at the temperature of 60° C. for 6 h.

Two different acrylic urethanes were prepared from Acrylic Polymer 2, as described above, by reacting Acrylic Polymer 2 with the partially-blocked polyisocyanate. In particular, 1000 parts by weight of Acrylic Polymer 2 were added to a reactor and heated to 75° C. under nitrogen blanket. To this reactor, the partially-blocked polyisocyanate was added over 60 minutes with reaction temperature kept at below 75° C. For Acrylic Urethane 1, 120 parts by weight of partially-blocked polyisocyanate was added. For Acrylic Urethane 2, 240 parts by weight of partially-blocked polyisocyanate was added. The mixture was maintained at 75° C. until all isocyanate was reacted as determined by IR analysis. Acrylic Urethane 1 had a Mw of about 5500 gram/mole and an OH value of 111 by solids. Acrylic Urethane 2 had a Mw of about 6000 gram/mole and an OH value of 82 by solids.

1K coating compositions were prepared by combining the components set forth in TABLE II in the listed order, where all amounts are based upon weight % non-volatiles of the 1K coating composition, except for amounts indicated as "f.w." which are based upon the total formula weight.

TABLE II

|  | Comp. Ex. 1 | Comp Ex. 2 | Ex. 1 | Ex. 2 | Ex. 3 |
|---|---|---|---|---|---|
| Crosslinker 1 | 26 | 26 | 26 | 26 | 26 |
| Additive A | 1 | 1 | 1 | 1 | 1 |
| Additive B | 2 | 2 | 2 | 2 | 2 |
| Acrylic Polymer 3 | 20 | — | — | — | — |
| Catalyst | 1 | 1 | 1 | 1 | 1 |
| Additive C | 0.31 f.w. | 0.31 f.w. | 0.31 f.w. | 0.31 f.w. | 0.31 f.w. |
| Additive D* | 10.00 f.w. | 10.00 f.w. | 10.00 f.w. | 10.00 f.w. | 10.00 f.w. |
| Additive E | 2.00 f.w. | 2.00 f.w. | 2.00 f.w. | 2.00 f.w. | 2.00 f.w. |
| Urethane Oligomer | 18 | 18 | 18 | 18 | 18 |
| Silane Polymer 1 | 8 | 8 | 8 | 8 | 8 |
| Silane Polymer 2 | 20 | — | — | — | — |
| Acrylic Polymer 1 | — | 40 | 12 | 12 | 12 |
| Acrylic Polymer 2 | — | — | 28 | — | — |
| Acrylic Urethane 1 | — | — | — | 28 | — |
| Acrylic Urethane 2 | — | — | — | — | 28 |
| Solvent 1 | 3.00 f.w. | 3.00 f.w. | 3.00 f.w. | 3.00 f.w. | 3.00 f.w. |

*The balance of non-volatile weight percentage to equal 100 in each column is contributed from Acrylic Polymer 5 in Additive D Crosslinker 1 is a 50/50 methylated/butylated melamine commercially available from Cytec Surface Specialties UCB, St. Louis, Mo.

Additive A is aminoether (NOR) hindered amine light stabilizer (HALS) commercially available from Ciba Specialty Chemicals, Tarrytown, N.Y.

Additive B is a UV absorber of the hydroxyphenyl benzotriazole type commercially available from Ciba Specialty Chemicals, Tarrytown, N.Y.

Acrylic Polymer 3 is a non-aqueous dispersion of an acrylic polymer formed from free-radical polymerization of STY/BA/BMA/HEA/MAA/GMA in a weight ratio of 14.7/43.6/27.5/10.1/2.3/1.7 prepared in accordance with the procedure described in U.S. Pat. No. 5,747,590 at column 8, lines 46-68 and column 9, lines 1-25.

Catalyst is dodecyl benzene sulfonic acid salt of 2-amino-2-methyl-1-propanol commercially available from King Industries, Norwalk, Conn.

Additive C is a 50% wt solution of Disparlon® L-1984 surface control agent in aromatic 100, commercially available from King Industries, Norwalk, Conn.

Additive D is a dispersion of hydrophobic fumed silica after-treated with an octylsilane and commercially available from Degussa, Parsippany, N.J., ground with Acrylic Polymer 5 with a weight ratio of hydrophobic fumed silica to Acrylic Polymer 5 of about 35.7%.

Additive E is trimethyl orthoacetate.

Solvent 1 is butanol.

The 1K coating compositions represented by Comparative Examples 1 and 2 as well as Examples 1-3 of TABLE II were reduced to a spray viscosity of 42 seconds at 25° C. on a #4 Ford cup by adding ethyl 3-ethoxy propionate (EEP) to each composition. The reduced 1K coating compositions were bell-sprayed to form a topcoat layer having a thickness of from about 40 to about 50 microns over an uncured basecoat layer formed from a water-borne black basecoat composition on a steel substrate pre-coated with an electrocoat layer and a primer layer. The water-borne black basecoat composition is commercially available from Axalta Coating Systems of Philadelphia, Pa. under code 562S61226. The primer layer is formed from a primary composition commercially available from Axalta Coating Systems under code 554-DN082. The electrocoat layer is formed from an electrocoat composition commercially available from Axalta Coating Systems under the name ES21.

The water-borne black basecoat composition was applied in two coats by bell with 60 seconds flash in between over the primed, electrocoated steel substrate under a booth condition of 23.9° C. and 65% humidity. The panels with the water-borne black basecoat composition applied thereon were prebaked for about 10 minutes at about 82.2° C. before the reduced 1K coating compositions were sprayed on. The panels were then flashed of solvents for 10 minutes and baked in a convection oven for 30 minutes at 140° C.

For environmental acid rain etch resistance tests, 12×12" panels with a respective topcoat layer formed from the reduced 1K coating compositions of TABLE II were horizontally exposed on tables set up in a site located in Blount Island, Jacksonville, Fla. The duration of exposure is typically 3 months from the end of May to the end of August each year, or the so-called Jacksonville exposure. Environmental resistance, determined based upon the severity of etching, was rated on a scale of 0-10, with 0 meaning no etching, while 10 meaning most severe etching. A etch rating of 7 or less is generally considered acceptable by automakers. Environmental resistance for the respective panels is provided in TABLE III below.

TABLE III

|  | Topcoat Dry Solids OH Number | Jacksonville Etch |
| --- | --- | --- |
| Comp. Ex. 1 | 40 | 7 |
| Comp. Ex. 2 | 73 | 9 |
| Example 1 | 69 | 7 |
| Example 2 | 59 | 7 |
| Example 3 | 51 | 7 |

Additional 1K coating compositions were prepared by combining the components set forth in TABLE IV in the listed order, where all amounts are based upon weight % non-volatiles of the 1K coating composition, except for amounts indicated as "f.w." which are based upon the total formula weight.

TABLE IV

|  | Comp. Ex. 3 | Comp. Ex. 4 | Ex. 4 | Ex. 5 | Ex. 6 |
| --- | --- | --- | --- | --- | --- |
| Microgel | 3 | 3 | 3 | 3 | 3 |
| Crosslinker 2 | 22 | 26 | 22 | 22 | 22 |
| Additive A | 1 | 1 | 1 | 1 | 1 |
| Additive B | 2 | 2 | 2 | 2 | 2 |
| Acrylic Polymer 3 | 12 | 12 | 12 | 12 | 12 |
| Catalyst | 1.2 | 1.2 | 1.2 | 1.2 | 1.2 |
| Additive E | 0.31 f.w. | 0.31 f.w. | 0.31 f.w. | 0.31 f.w. | 0.31 f.w. |
| Additive D | 8.00 f.w. | 8.00 f.w. | 8.00 f.w. | 8.00 f.w. | 8.00 f.w. |
| Additive F | 2.00 f.w. | 2.00 f.w. | 2.00 f.w. | 2.00 f.w. | 2.00 f.w. |
| Urethane Oligomer | 12 | 12 | 12 | 12 | 12 |
| Silane Polymer 1 | 7 | — | — | — | — |
| Silane Polymer 2 | 33 | — | — | — | — |
| Acrylic Polymer 4 | 5 | 37 | 5 | 5 | 5 |
| Acrylic Polymer 1 | — | — | — | — | — |
| Acrylic Polymer 2 | — | — | 37 | — | — |
| Acrylic Urethane 1 | — | — | — | 37 | — |
| Acrylic Urethane 2 | — | — | — | — | 37 |
| Solvent 2 | 13.00 f.w. | 13.00 f.w. | 13.00 f.w. | 13.00 f.w. | 13.00 f.w. |

Microgel is described in Resin Example 3 in U.S. Pat. No. 7,144,631.

Crosslinker 2 is a highly alkylated methoxylmethyl, isobutoxymethyl melamine-formaldehyde resin commercially available from Cytec Industries Inc., West Patterson, N.J.

Additive E is an acrylic polymer flow aid commercially available from Estron Chemicals Inc., Parsippany, N.J.

Additive F is trimethyl orthoacetate moisture scavenger.

Solvent 2 is a 50/50 blend by weight of N-butyl butanol and Aromatic 100 commercially available from Exxon Mobil Chemical, Houston, Tex.

The 1K coating compositions represented by Comparative Examples 3 and 4 as well as Examples 4-6 of TABLE II were reduced to a spray viscosity of 38 seconds at 25° C. on a #4 Ford cup by adding ethyl 3-ethoxy propionate (EEP) to each composition. The reduced 1K coating compositions were bell-sprayed to form a topcoat layer having a thickness of from about 40 to about 50 microns over an uncured basecoat layer formed from a solvent-borne black basecoat composition on a steel substrate pre-coated with an electrocoat layer and a primer layer. The solvent-borne black basecoat composition is commercially available from Axalta Coating Systems of Philadelphia, Pa. under code 648A01175. The primer layer is formed from a primary composition commercially available from Axalta Coating Systems under code 554-DN082. The electrocoat layer is formed from an electrocoat composition commercially available from Axalta Coating Systems under the name ES21.

The solvent-borne black basecoat composition was applied in two coats by bell with 60 seconds flash in between over the primed, electrocoated steel substrate under a booth condition of 23.9° C. and 55% humidity. The freshly sprayed basecoat layer was flashed for 5 minutes under ambient condition before the 1K coating compositions were sprayed to form the topcoat layer. The panels were then flashed of solvents for 10 minutes and baked in a convection oven for 30 minutes at 140° C.

Environmental resistance for 12×12" panels with a respective topcoat layer formed from the reduced 1K coating compositions of TABLE IV was tested in the same manner as described above. Environmental resistance for the respective panels is provided in TABLE V below.

TABLE V

|  | Topcoat Dry Solids OH Number | Jacksonville Etch |
| --- | --- | --- |
| Comp. Ex. 3 | 52 | 6 |
| Comp. Ex. 4 | 72 | 9 |
| Ex. 4 | 76 | 7 |

TABLE V-continued

|  | Topcoat Dry Solids OH Number | Jacksonville Etch |
|---|---|---|
| Ex. 5 | 61 | 6 |
| Ex. 6 | 52 | 6 |

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration in any way. Rather, the foregoing detailed description will provide those skilled in the art with a convenient road map for implementing an exemplary embodiment. It being understood that various changes may be made in the function and arrangement of elements described in an exemplary embodiment without departing from the scope as set forth in the appended claims.

What is claimed is:

1. A 1K coating composition comprising:
an acrylic polymer having a nominal Tg of at least 25° C., wherein the acrylic polymer has the following general formula:

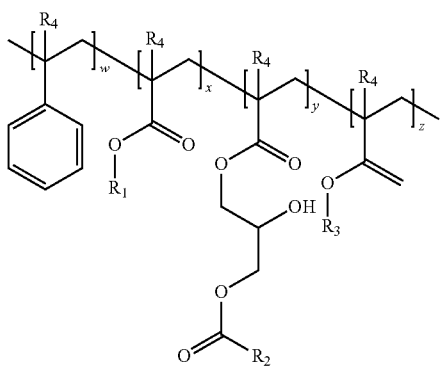

wherein:
$R_1$ is a primary hydroxyalkyl group or a urethane-containing group formed therefrom;
$R_2$ is a branched alkyl group;
$R_3$ is chosen from a secondary hydroxyalkyl group, an alkyl group, or a combination thereof;
$R_4$ is individually chosen from hydrogen or a methyl group;
w, x, and y are each at least 1; and
z is 0 or at least 1; and
a melamine crosslinker.

2. The 1K coating composition of claim 1, wherein z is at least 1 and $R_3$ comprises the secondary hydroxyalkyl group.

3. The 1K coating composition of claim 2, wherein z is at least 2 and $R_3$ individually comprises the secondary hydroxyalkyl group and the alkyl group.

4. The 1K coating composition of claim 1, wherein $R_1$ comprises the urethane-containing group formed from the primary hydroxyalkyl group.

5. The 1K coating composition of claim 4, wherein $R_1$ comprises the reaction product of the primary hydroxyalkyl group and a partially-blocked polyisocyanate having at least one free isocyanate group.

6. The 1K coating composition of claim 5, wherein the partially-blocked polyisocyanate comprises isocyanate groups blocked with a permanent blocking group.

7. The 1K coating composition of claim 5, wherein the partially-blocked polyisocyanate comprises isocyanate groups blocked with a removable blocking group.

8. The 1K coating composition of claim 1, wherein the acrylic polymer is present as a species of a resin component, and wherein the resin component further comprises a second acrylic polymer different from the acrylic polymer that has the nominal Tg of at least 25° C.

9. The 1K coating composition of claim 8, wherein the resin component further comprises a urethane oligomer comprising a urethane-containing backbone.

* * * * *